(12) United States Patent
Scholl et al.

(10) Patent No.: US 9,172,599 B1
(45) Date of Patent: Oct. 27, 2015

(54) FAULT TOLERANT FOLDED CLOS NETWORKS

(71) Applicant: Amazon Technologies, Inc., Reno, NV (US)

(72) Inventors: Thomas Bradley Scholl, Seattle, WA (US); Andrew Bruce Dickinson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 141 days.

(21) Appl. No.: 14/109,569

(22) Filed: Dec. 17, 2013

(51) Int. Cl.
*G01R 31/08* (2006.01)
*H04L 12/24* (2006.01)
*H04L 12/707* (2013.01)

(52) U.S. Cl.
CPC ............ *H04L 41/0654* (2013.01); *H04L 45/22* (2013.01)

(58) Field of Classification Search
CPC ..... H04L 41/00; H04L 41/06; H04L 41/0604; H04L 41/0654; H04L 41/0668; H04L 45/00; H04L 45/04; H04L 45/22; H04L 45/58; H04L 45/60; H04L 12/00; H04L 12/02
See application file for complete search history.

(56) References Cited

U.S. PATENT DOCUMENTS

| | | | | |
|---|---|---|---|---|
| 8,879,397 | B2* | 11/2014 | Xi et al. | 370/237 |
| 2009/0310610 | A1* | 12/2009 | Sandstrom | 370/392 |
| 2011/0051724 | A1* | 3/2011 | Scott et al. | 370/389 |

OTHER PUBLICATIONS

U.S. Appl. No. 13/252,712, entitled Dynamic Network Device Configuration and filed Oct. 4, 2011.

* cited by examiner

*Primary Examiner* — Anh Ngoc Nguyen
(74) *Attorney, Agent, or Firm* — Knobbe Martens Olson & Bear, LLP

(57) ABSTRACT

Systems and methods are described to provide fault tolerant folded Clos networks. A folded Clos network is disclosed including a set of tier 1 routers interconnected with a set of tier 2 routers. Tier 1 routers are configured to view a set of tier 2 routers as a single aggregate router. Accordingly, tier 1 routers are unaware of faults between tier 2 routers and additional tier 1 routers. A throwback router is connected to each tier 2 router to facilitate handling of data under such fault conditions. When a tier 2 router receives undeliverable data, the data is passed to a throwback router, which retransmits the data to an additional tier 2 router. Data that is retransmitted multiple times can be disregarded by the throwback router.

23 Claims, 6 Drawing Sheets

FAULT TOLERANT FOLDED CLOS NETWORKS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Interconnection of computing devices may be facilitated by networking technologies, such as wired Ethernet connections. Computing devices may be interconnected according to a number of topologies (e.g., ring, star, tree, etc.). In order to provide greater flexibility in configuration, networks may utilize networking devices configured to facilitate communication between devices. For example, a hub, switch or multi-port router may facilitate communication between multiple computing devices or other networking devices. Generally, the cost and complexity of the networking device increases greatly as the number of connectable devices increases. Therefore, networking topologies may attempt to utilize multiple, low-connectivity (and therefore low cost) networking devices in place of a single high-connectivity, high cost networking device. Such solutions generally increase the complexity of routing communications over a network.

DETAILED DESCRIPTION

Figure 1A:
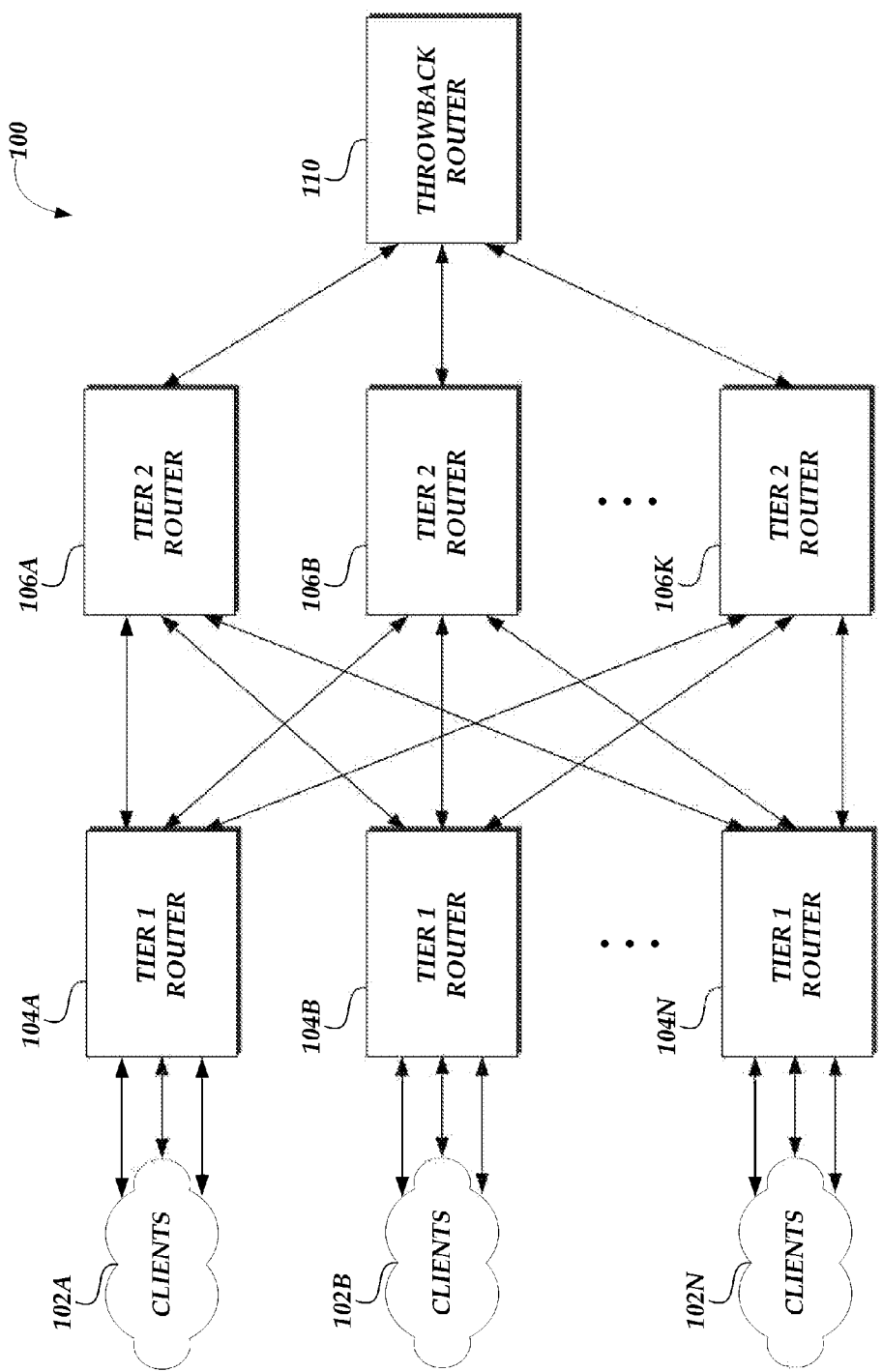
FIG. 1A is a block diagram depicting an illustrative physical view of a folded Clos network utilizing a throwback router to increase network resilience.

Generally described, aspects of the present disclosure relate to the management of communications within a folded Clos network under fault conditions (e.g., link failure between two networking devices). Specifically, aspects of the present disclosure enable the use of link aggregation protocols in a folded Clos network to reduce routing protocol complexity. While such link aggregation protocols may be desirable due to efficiency gains, use of these protocols may limit the folded Clos network's ability to route data under some fault conditions. Accordingly, aspects of the present disclosure further enable the use of one or more throwback routers. Such a throwback router may function as a modified tier 1 router within the folded Clos network, and act as a failover route for otherwise unroutable packets. As will be described in more detail below, the use of one or more throwback routers may therefore enable successful routing within a folded Clos network under fault conditions, even when utilizing link aggregation protocols.

A folded Clos network may generally include a set of n tier 1 routers (where n is any number greater than 1) in communication with client computing devices, as well as a set of k tier 2 routers (where k is any number greater than 1) configured to facilitate communication between tier 1 routers. Each tier 1 router is directly connected to each tier 2 router, thereby providing k communication links between any two tier 1 routers. This configuration therefore allows for high bandwidth interconnection between multiple tier 1 routers. In addition, because each tier 2 router need only include n communication ports, multiple low cost routers can be utilized in place of a single high cost router.

However, the use of multiple routers within a folded Clos network can significantly increase the complexity of routing over that network. For example, the number of valid routes between two tier 1 routers within a folded Clos network is equal to k, the number of tier 2 routers in the network. The use of routing protocols, such as OSPF, IGRP or EIGRP, to determine preferred routes within this network structure can place a significant burden on both tier 1 and tier 2 routers. Such protocols are generally implemented in a router's control plane, which is typically associated with less processing power than the router's forwarding plane. The burden caused by use of these routing protocols may therefore lead to undesirable performance degradation on a network.

In order to increase the performance of a folded Clos network, tier 2 routers may be configured to function primarily as data link layer devices (e.g., layer two of the Open Systems Interconnection [OSI] model). Specifically, individual tier 2 routers may be logically combined in order to create a single logical tier 2 router. In such a configuration, tier 1 routers are configured to view connections to any tier 2 router as an aggregated link to a single logical router. Because the number of valid routes between tier 1 routers is reduced to a single logical router (via the single logical router), routing complexity is reduced. In this instance, simplified routing protocols, such as Link Aggregation Control Protocol (LACP), may be used, reducing the processing requirements on the control plane functionality of tier 1 and tier 2 routers.

One potential issue with the configuration of tier 2 routers in a folded Clos network as a single, logical router is a reduction in fault tolerance, particularly with regard to failure of an outgoing link on a tier 2 router. Because link aggregation protocols generally assume equal functionality on all aggregated links, failure of a single link is expected not to impact data routing. Due to this, a tier 1 router may not be aware of non-local link failures (e.g., link failures between other tier 1 routers and a tier 2 router). Accordingly, while data may logically be transmitted to a single tier 2 for transmission to a destination tier 1 router, that single tier 2 router may not have a valid connection to the destination tier 1 router.

As an illustrative example, consider a folded Clos network including two tier 1 routers and two tier 2 routers. Such a network would include four links—from each tier 1 router to each tier 2 router. Traffic routed from the first tier 1 router to the second tier 1 router could therefore utilize two valid physical links—via either the first or second tier 2 router. Where such a network utilizes link aggregation, the tier 2 routers would act as a single, logical tier 2 router. Accordingly, each tier 1 router would appear to include two aggregated connections to the single aggregate tier 2 router. Traffic routed from the first tier 1 router to the second tier 1 router could therefore utilize only a single valid logical link, routed over either physical link (as selected by the tier 1 router according to a link aggregation protocol).

Assume that, in the example network discussed above, a link failure occurs between the second tier 1 router and the second tier 2 router. Because the link failure is not directly connected to the first tier 1 router, this first tier 1 router is unaware of the failure. Moreover, a valid path to the second tier 2 router still appears to exist via the aggregated tier 2 router (because a physical link remains via the first physical tier 1 router). Accordingly, the first tier 1 router is configured to utilize either valid physical link to transmit data to the second tier 1 router. In the instance that the first tier 1 router utilizes the physical link to the second tier 2 router, the transmitted data becomes unroutable (because the link between the second tier 1 router and the second tier 2 is faulty).

In accordance with aspects of the present disclosure, this unroutable traffic may be routed by use of a throwback router, which may operate as a modified tier 1 router. Specifically, consider an example where the network described above includes one additional tier 1 router, configured as a throwback router. While the data packet may be unable to reach the destination second tier 1 router via the second tier 2 router, the data packet may nonetheless be transmitted to the throwback router. The throwback router, as a tier 1 router, maintains a physical connection to each tier 2 router. Accordingly, the throwback router may select an alternative tier 2 router (e.g., the first tier 2 router, which maintains its connection to the second tier 1 router). By transmitting the data to the alternative tier 2 router, the data may be successfully transmitted to its intended destination.

Advantageously, use of a throwback router does not require modification of routing protocols used within a folded Clos network. Rather, because a throwback router functions as a modified tier 1 router, a throwback router may be easily integrated into an existing Clos network configuration. Furthermore, as will be described in more detail below, multiple throwback routers can be used to increase the fault tolerance of a folded Clos network to a desired level. Further, in some instances little or no modification of tier 2 routers may be necessary in order to facilitate use of a throwback router. For example, tier 2 routers may, by default, be configured in the event of a link failure (e.g., failure to locate a corresponding MAC address within a routing table) to broadcast any packets to all connected devices. A throwback router may therefore automatically receive packets from a tier 2 router in the event of a link failure. In some such instances, a tier 2 router may be modified or configured to broadcast packets only to one or more throwback routers in the event of a link failure, thereby reducing network traffic to connected tier 1 routers. Accordingly, the use of a throwback router within a folded Clos network may require little or no modification to existing devices.

While portions of the present disclosure may refer to "physical" and "logical" network structures for clarity and ease of reference, such references are not intended to limit the present disclosure to application on "physical" networks. Rather, a "physical" network as described herein may correspond to any underlying network structure, including virtualized network structures, that may be aggregated to form a "logical" network structure. For example, in one instance, "physical" tier 1 and tier 2 routers may be implemented by a virtual computing environment (e.g., a "cloud computing" environment).

Moreover, while connections between devices may be referred to herein individually (e.g., as a single connection), embodiments of the present disclosure may utilize multiple, parallel connections in place of a singular connection. For example, in one embodiment, a tier 1 router may be connected to a tier 2 router by two or more connections. Utilization of parallel connections may increase bandwidth and resiliency over communication links.

The foregoing aspects and many of the attendant advantages will become more readily appreciated as the same become better understood by reference to the following description of one illustrative embodiment, when taken in conjunction with the accompanying drawings depicting the illustrative embodiment.

FIG. 1A is a block diagram illustrating a physical structure of one embodiment of a folded Clos network 100. The folded Clos network 100 includes n tier 1 routers 104A through 104N, each connected to k tier 2 routers 106A through 106K. Each tier 1 router 104 and tier 2 router 160 may illustratively represent an enterprise or consumer level routing computing device configured to route data between client computing devices 102 over the folded Clos network 100. The term "router" is generally used herein to correspond to any networking device configured to transport data within the folded Clos network 100, including without limitation layer 3 routers, gateways and switches. Accordingly, the term router is not intended to be limited to devices operating exclusively or primarily in layer 3 of the OSI model, but may include devices operating in other layers of the OSI model (e.g., layer 2) or outside of the OSI model.

Each tier 1 router 104 may be connected to a number of client devices 102 communicating over the folded Clos network 100. Client devices 102 may include, for example, server computing devices, laptop computers, tablet computers, personal computers, personal digital assistants (PDAs), hybrid PDA/mobile phones, mobile phones, electronic book readers, set-top boxes, cameras, digital media players and the like. In one embodiment, client computing devices 102 may include routing devices, such as hubs, switches, bridges or routers. In the example of FIG. 1, tier 1 router 104A is connected to client computing devices 102A, while tier 1 router 104B is connected to client computing devices 102B, and tier 1 router 104N is connected to client computing devices 102N.

While the illustrative folded Clos network 100 is depicted as including three tier 1 routers 104 and three tier 2 routers 106, the folded Clos network 100 may include any number of tier 1 routers 104 and tier 2 routers 106. Moreover, the number of tier 1 routers 104 and tier 2 routers 106 may be different. The number of tier 1 routers 104 and tier 2 routers 106 may be dependent, for example, on the number of connections each tier 1 router 104 or tier 2 router 106 may support, the number of computing devices 102 connected, and data transmission requirements on the folded Clos network 100. While the tier 1 routers 104 of FIG. 1 are depicted as utilizing three connections to their respective client computing devices 102, any number of connections may exist between respective tier 1 routers 104 and client computing devices 102. In some instances, the folded Clos network 100 may be configured to ensure that the number of connections between tier 1 routers 104 and their respective client computing devices 102 is less than the number of tier 2 routers 106.

As can be seen in FIG. 1A, data transmitted from a given tier 1 router 104 may reach each other tier 1 router 104 via k network paths. For example, data transmitted from tier 1 router 104A to tier 1 router 104B may travel through any tier 2 router 106. Accordingly, the folded Clos network 100 provides a network structure scalable based on the number of tier 2 routers 106. Furthermore, because each tier 2 router 106 is only required to support a single connection to each tier 1 router 104, the cost and complexity of each tier 2 router 106 can be reduced.

FIG. 1A further includes a throwback router 110 configured to provide resiliency to the folded Clos network 100 via fault tolerance. Similarly to a tier 1 router 104, the throwback router 110 is connected to each tier 2 router 106 via a single connection. Accordingly, the throwback router 110 may be viewed as a specially designated tier 1 router 104. As will be described below, the throwback router 110 is configured to provide an alternate routing in the event of a link failure (e.g., a physical link failure, a logical link failure or other condition inhibiting or preventing communication) between a tier 2 router 106 and a destination tier 1 router 104. Specifically, in the event of a link failure, each tier 2 router 106 is configured to utilize the throwback router 110 as a default pathway. The throwback router 110, in turn, is configured to retransmit received data to an alternative tier 2 router 106. In the event that the alternative tier 2 router 106 has a successful connection to the destination tier 1 router 104, routing of the data will succeed. In the event that the alternative tier 2 router 106 does not have a successful connection to the destination tier 1 router 104, the data returns to the throwback router 110, where a second alternative tier 2 router 106 is selected. This transmission and return process may continue until a successful connection to the destination tier 1 router 104 is found. As will be described below, in some instances, the throwback router 110 (or other router within the folded Clos network 100) may be configured to monitor retransmission of data through the folded Clos network 100, or to implement a timeout counter for retransmitted data. These procedures may ensure that such data is not infinitely relayed between various tier 2 routers 106 and the throwback router 110.

While shown within FIG. 1A as a single device, embodiments of the present disclosure may utilize multiple throwback routers 110. Illustratively, multiple throwback routers may be utilized to increase the fault tolerance of the folded Clos network 100 (e.g., to spread data forwarding responsibilities across throwback routers 110, or to ensure against link failure to the throwback router 110). Further, while shown within FIG. 1A as a separate device, in some embodiments the throwback router 110 may be implemented by one or more tier 1 router 104. In one embodiment, each tier 1 router 104 may implement a throwback router. Such an embodiment may result in throwback functionality being shared across all tier 1 routers 104.

A folded Clos network 100 may be configured to utilize any number of routing protocols to facilitate transmission between various tier 1 routers 104. However, layer three routing protocols, such as OSPF, IGRP and EIGRP, may increase complexity when implemented within the folded Clos network 100, especially as k increases. This complexity may, in turn, require a high level of processing power on the part of tier 1 routers 104 or tier 2 routers 106. Because this complexity may be undesirable both for performance and cost reasons, these layer three routing protocols may themselves be undesirable for use on the folded Clos network 100.

In order to simplify routing within the folded Clos network 100, and reduce processing power requirements of the tier 1 routers 104 and tier 2 routers 106, the folded Clos network 100 may utilize link aggregation protocols. Such link aggregation protocols may be used to aggregate all tier 2 routers 106 into a single, logical tier 2 router. One illustrative example of a logical view of the folded Clos network 100 when utilizing link aggregation protocols is shown within FIG. 1B.

Figure 1B:
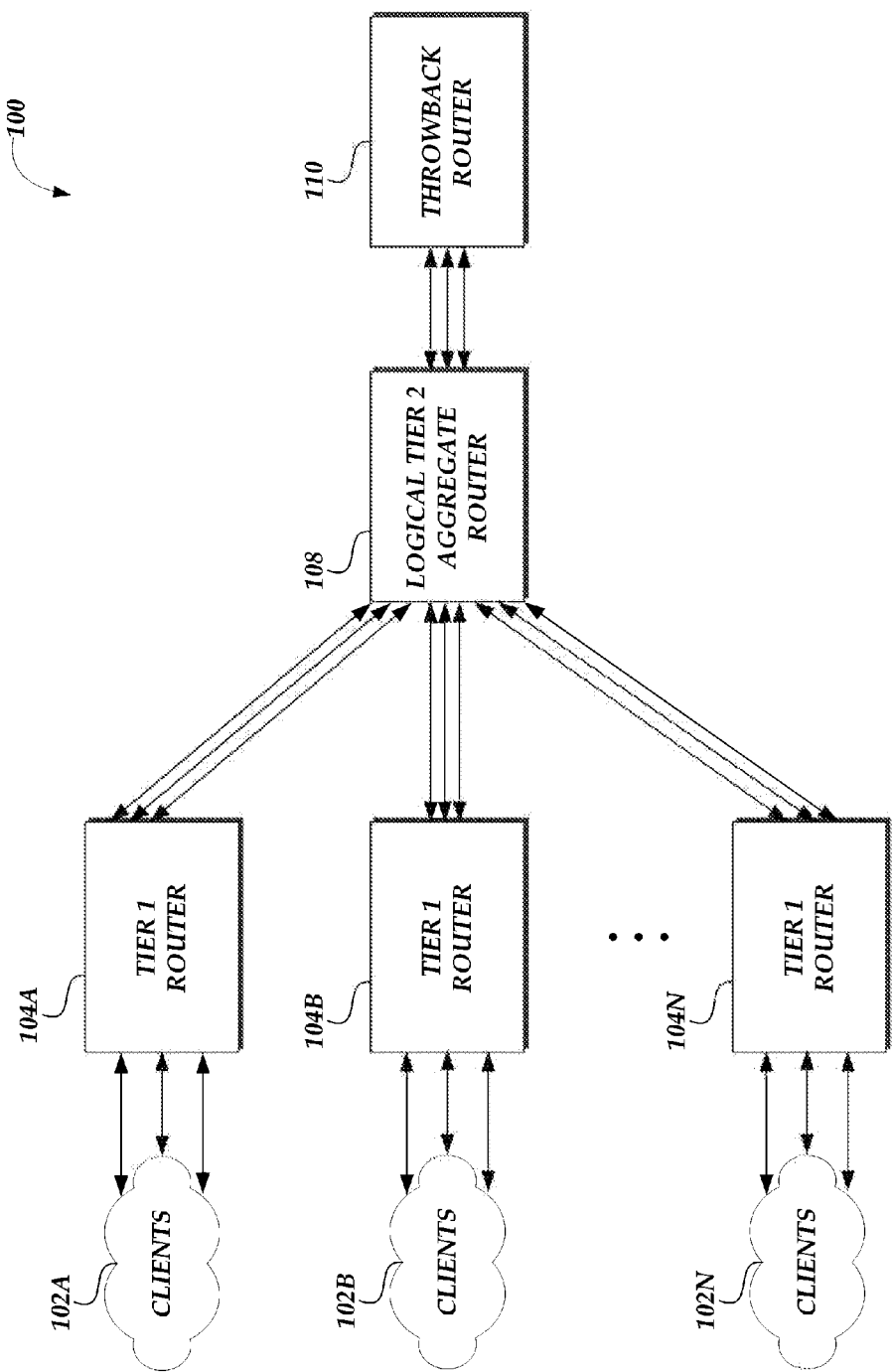
FIG. 1B is a block diagram illustrating an illustrative logical view of the folded Clos network of FIG. 1A.

Specifically, FIG. 1B includes a single logical tier 2 router 108 in place of the k tier 2 routers 106 of FIG. 1A. Because the logical tier 2 router 108 represents an aggregate of each tier 2 router 106, each tier 1 router 104 maintains k connections with the logical tier 2 router 108. Similarly, the throwback router 110 maintains k connections with the logical tier 2 router 108. Because each tier 1 router 104 is aware of only the single logical tier 2 router 108, routing within the folded Clos network 110 is significantly simplified. Specifically, each data packet transmitted between tier 1 routers 104 must be transmitted through the logical tier 2 router 108.

Illustratively, the tier 1 routers 104 may utilize link aggregation in communicating with the logical tier 2 router 108. Selection of a communication channel on which to transmit data to the logical tier 2 router 108 may be accomplished according a hashing algorithm, such as a flow hash algorithm. For example, each incoming data packet may be processed via a load-balancing hashing algorithm that results in one of k outputs, which corresponds to one of the k available communication channels to the logical tier 2 router 108. The data packet may then be routed to the logical tier 2 router 108 via the kth communication channel. From a physical viewpoint, the data packet would therefore be routed to the kth tier 2 router 106 for delivery to the destination tier 1 router 104.

In the logical view of FIG. 1B, each tier 1 router 104 may be unable to detect link failures not directly connected to the individual tier 1 router 104. For example, a link failure between tier 1 router 104A and tier 2 router 106A (aggregated within the logical tier 2 router 108) may not be detectable by tier 1 router 104B. Accordingly, tier 1 router 104B may continue to attempt to transmit data intended for tier 1 router 104A to tier 2 router 106A (e.g., via utilization of the communication channel between tier 1 router 104B and tier 2 router 106A). However, because tier 2 router 106A does not have a valid link to the destination tier 2 router 104A, the data packet would become unroutable. As will be described below, this deficiency may be corrected by utilization of throwback router 110, which functions to receive the data from the tier 2 router 106A (aggregated within the logical tier 2 router 108), and return the data to an alternative tier 2 router 106 (also aggregated within the logical tier 2 router 108).

Figure 2A:
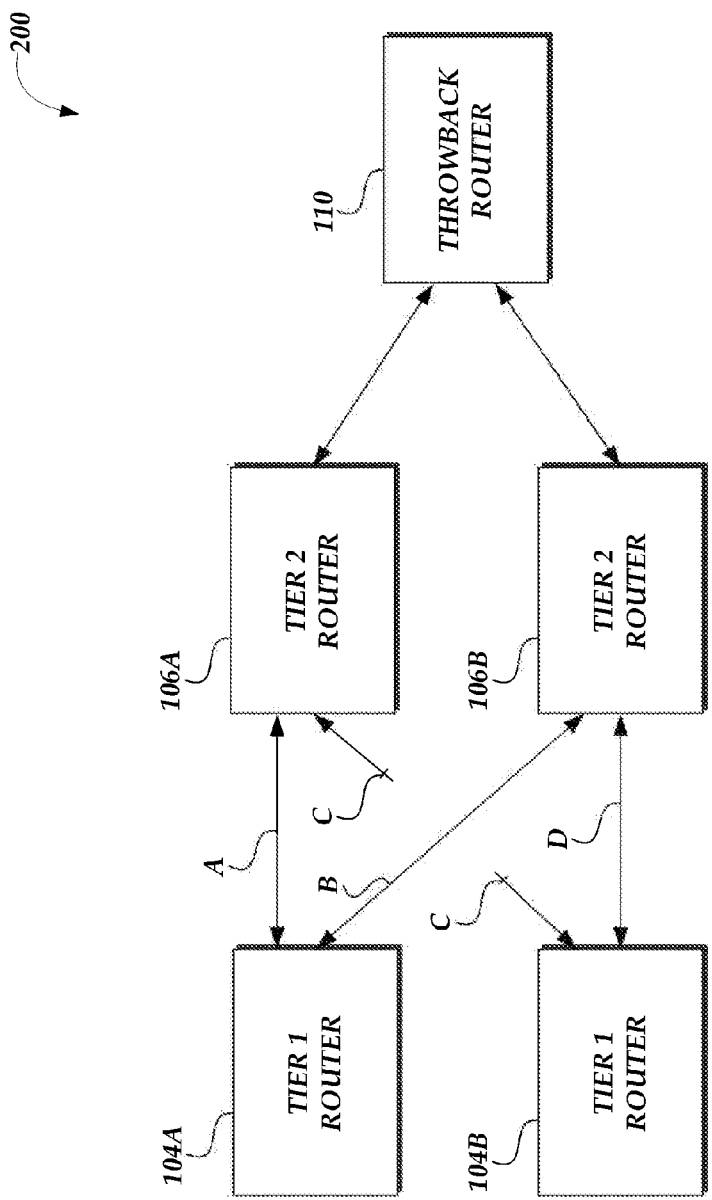
FIG. 2A is a block diagram illustrating a simplified physical view of the folded Clos network of FIG. 1A under fault conditions.

With reference to FIG. 2A, one portion 200 of the folded Clos network 100 of FIG. 1A is depicted under failure conditions. Specifically, the network portion 200 includes a first tier 1 router 104A and a second tier 1 router 104B, as well as a first tier 2 router 106A and a second tier 2 router 106B. As shown in FIG. 2A, tier 1 router 104A is connected to tier 2 router 106A via communication channel A, and to tier 2 router 106B via communication channel B. Similarly, tier 1 router 104B is connected to tier 2 router 106B via communication channel D. However, tier 1 router 104B's connection to tier 2 router 106A has failed, as represented by broken communication channel C. Illustratively, a link failure may correspond to a physical failure in communication channel C, or a logical failure of either tier 1 router 104B or tier 2 router 106A to communicate (e.g., via corruption of routing information). Accordingly, no communication channel exists between tier 1 router 104B and tier 2 router 106A. Furthermore, because the tier 1 routers 104 of FIG. 2A may utilize link aggregation protocols to simplify routing, tier 1 router 104A may be unaware of the broken communication channel C (as tier 1 router 104A is not directly connected to this communication channel).

While link failure is generally described herein with respect to a total failure, embodiments of the present application may further enable communication within the folded Clos network 100 under partial failure conditions. A partial failure may generally correspond to an instance where a tier 2 router 106 is unable to consistently or reliably communicate with a tier 1 router 104. In such instances, embodiments of the present application enable routing of any failed data to a throwback router 110, as described below.

Figure 2B:
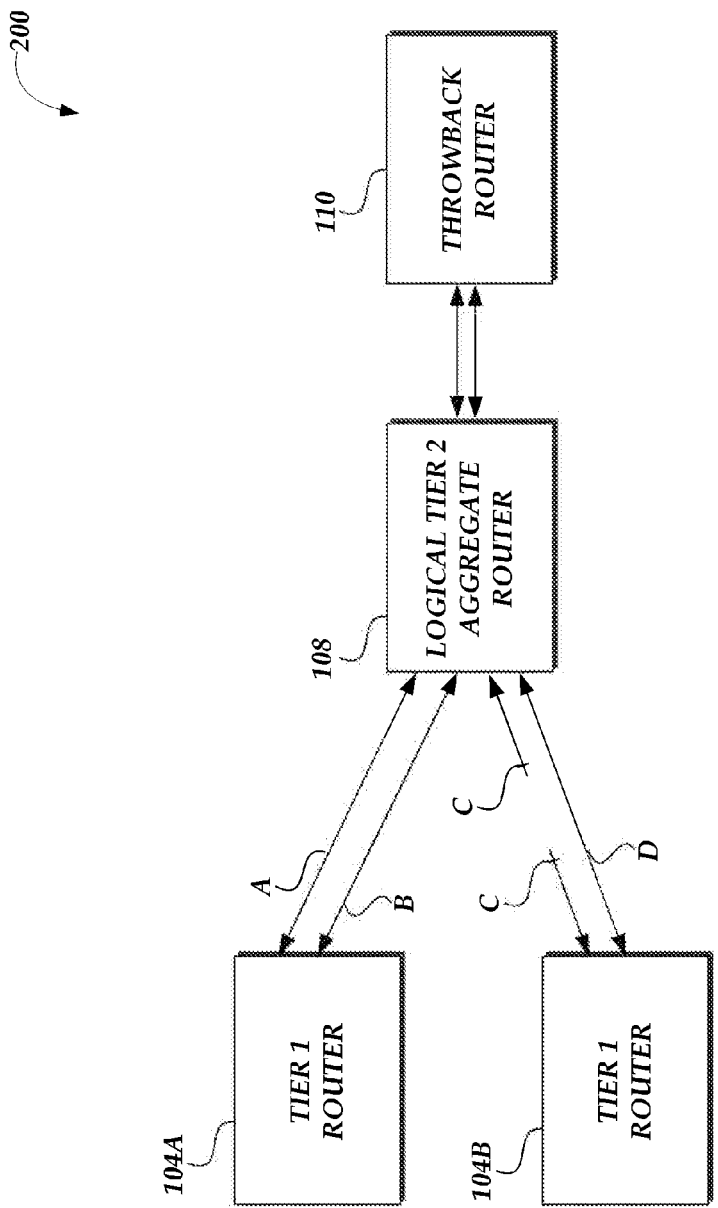
FIG. 2B is a block diagram illustrating a simplified logical view of the folded Clos network of FIG. 1A under fault conditions.

A logical view of the portion 200 of the folded Clos network 100 is depicted in FIG. 2B. Specifically, the tier 2 routers 106A and 106B are aggregated within FIG. 2B into a single logical tier 2 router 108. Therefore, it appears from the viewpoint of tier 1 router 104A that two communication channels exist to reach the logical tier 2 router 108, which is then capable of forwarding data to the tier 1 router 104B.

Accordingly, during data transmission from tier 1 router 104A to tier 1 router 104B, tier 1 router 104A may select either of communication channels A or B to carry the data. Illustratively, the specific communication channel may be selected according to a load-balancing algorithm, such as a flow hash algorithm or equal-cost multi-path routing (ECMP) algorithm. However, with reference to FIG. 2A, data transmitted via communication channel A is transmitted to tier 2 router 106A, which does not have a valid communication channel directly to destination tier 1 router 104B. Accordingly, tier 2 router 106A may determine that this data is unroutable. In a configuration lacking a throwback router 110, such an occurrence may result in undesirable failure of data transmission despite the fact that a valid transmission path does exist between tier 1 routers 104A and 104B.

Figure 3:
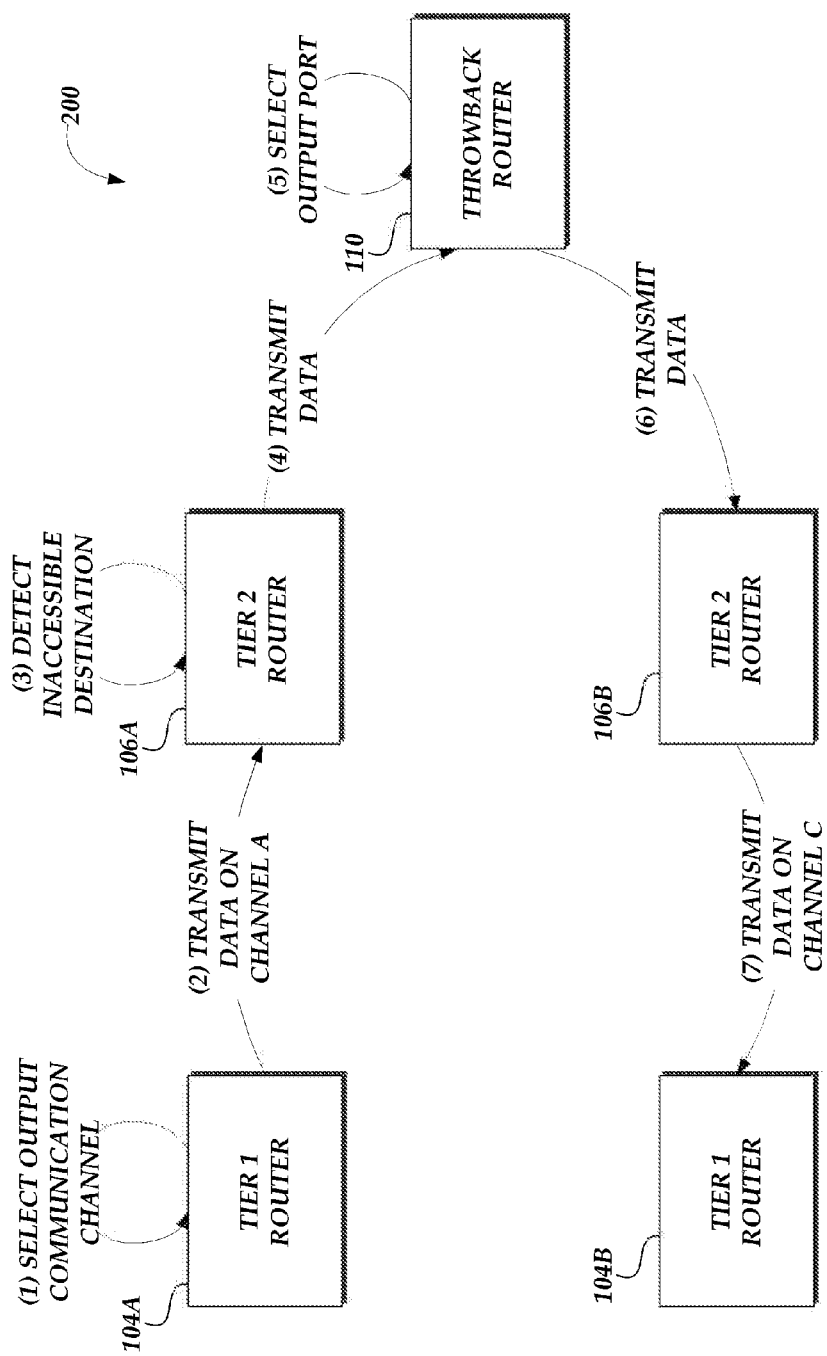
FIG. 3 is a block diagram illustrating the routing of a data packet by the folded Clos network of FIG. 1A during fault conditions by utilization of a throwback router.

With reference to FIG. 3, one illustrative interaction between the components of portion 200 in order to route packets under fault conditions will be described. Specifically, the interactions of FIG. 3 illustrate transmission of data from tier 1 router 104A to tier 1 router 104B via tier 2 router 106A, which lacks a direct communication channel to the destination tier 1 router 104B (e.g., due to failure of communication channel C of FIG. 2A).

The interactions of FIG. 3 begin at (1), where tier 1 router 104A selects an output communication channel for transmitting data to the tier 1 router 104B. Illustratively, the data may be received from a client computing device 102A for transmission to a client computing device 102B. The tier 1 router 104B is configured to select an output communication channel according to a load-balancing algorithm, such as a flow hash algorithm. In one embodiment, such a hash algorithm is executed on the data to be transmitted (e.g., a data packet), such that specific data packets are constantly routed over a specific communication channel. In the illustrative interactions of FIG. 3, the tier 1 router 104A selects communication channel A, corresponding to tier 2 router 106A. Accordingly, tier 1 router 104A forwards the data to the tier 2 router 106A for delivery to the destination tier 1 router 104B.

Generally, tier 2 router 106A may be configured to transmit the received data to the tier 1 router 104B via communication channel C of FIG. 2A. However, in the instance that communication channel C has failed, tier 2 router 106B detects an inaccessible destination at (3). The tier 2 router 106A is therefore configured to transmit the data to the throwback router 110 at (4). Illustratively, throwback router 110 may be viewed by the tier 2 router 106A as a "default" or "fallback" path, such that any data packet that is unable to reach its destination is routed to the throwback router 110.

In some embodiments, the network portion 200 may include multiple throwback routers 110. In such instances, the tier 2 router 106A may be configured to forward data intended for inaccessible destinations to any available throwback router 110 (e.g., selected according to a load-balancing algorithm).

After receiving data, the throwback router 110, at (5), selects an alternative tier 2 router 106B to which to transmit the data. In the example portion 200 of FIG. 3, only a single additional tier 2 router—tier 2 router 106B—is available for transmission. However, where multiple additional tier 2 routers are connected to the throwback router 110, the throwback router 110 may select a tier 2 router 106 according to a load-balancing algorithm. For example, where the folded Clos network 100 includes k tier 2 routers 106, the throwback router 110 can select any of k−1 tier 2 routers 106 (e.g., any tier 2 router 106 excluding tier 2 router 106A from which the data was received). Thereafter, the throwback router 110 transmits the data to the selected tier 2 router 106 at (6).

In the illustrative example of FIG. 3, tier 2 router 106B is in communication with the destination tier 1 router 104B via communication channel D. Accordingly, after reception of the data, the tier 2 router 106B forwards the data to tier 1 router 104B via communication channel D, at (7). The data is therefore successfully transmitted from tier 1 router 104A to tier 1 router 104B, despite failure of communication channel C.

One skilled in the art will appreciate that various alternative interactions may occur within the network portion 200. For example, assume that communication channel D, between tier 2 router 106B and tier 1 router 104B has failed. Further, assume that the network portion 200 includes an additional tier 2 router (e.g., tier 2 router 106K) in communication with the each tier 1 router 104 and the throwback router 110. Under such assumptions, the tier 2 router 106B may be unable to forward data to the destination tier 1 router 104B. Accordingly, interaction (7) may not occur. Instead, the tier 2 router 106B may detect that the destination tier 1 router 104B is an inaccessible destination, and return the data to the throwback router 110. The throwback router 110 may, in turn, select an alternative tier 2 router 106, such as tier 2 router 106K, to which to transmit the data. Because tier 2 router 106K has a valid communication channel to the destination tier 1 router 104B, transmission of data to the destination tier 1 router 104B would succeed. One skilled in the art will therefore appreciate that the fault tolerance of the folded Clos network 100 may be varied based on the number of tier 2 routers 106 within the network. Fault tolerance may further be increased by increasing the number of utilized throwback routers 110 (e.g., in order to tolerate link failures between tier 2 routers 106 and throwback routers 110).

Figure 4:
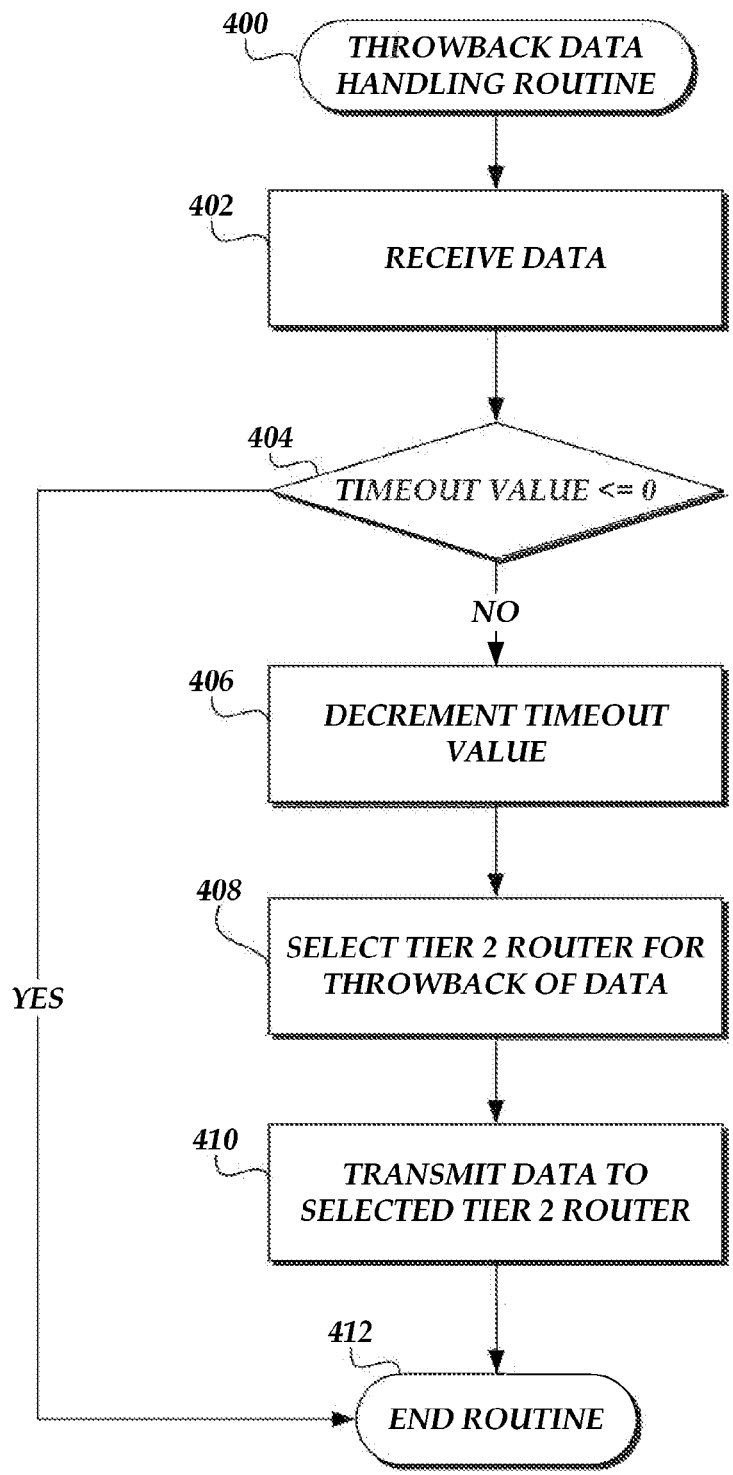
FIG. 4 is a flow-diagram illustrating a packet handling routine implemented by a throwback router to facilitate packet routing during fault conditions on the e folded Clos network of FIG. 1A.

With reference to FIG. 4, one illustrative routine 400 to facilitate rerouting of data within a folded Clos network 100 due to link failure will be described. The routine 400 may be implemented, for example, by a throwback router 110 within the folded Clos network 100 of FIG. 1A. As will be described below, the routine 400 may enable routing of data (e.g., in the form of Ethernet data packets or Ethernet data frames) even under failure of a portion of the folded Clos network 100. In addition, the routine 400 may enable a throwback router 110 to prevent lengthy or infinite looping of data within the folded Clos network 100 (e.g., due to a totally unreachable tier 1 router 104). Specifically, the routine 400 may utilize a timeout value of each routed data packet or data frame in order to detect repeating data packets or frames. In one embodiment, timeout values may be included within data itself. For example, in networks that do not utilize IEEE 802.1Q or IEEE 802.1P tagging, a timeout value may be included within a frame at a position corresponding to the optional 802.1Q or 802.1P tags. In one embodiment, a timeout value of data may be initialized by a transmitting tier 1 router 104. Alternative embodiments are described in further detail below.

The illustrative routine 400 may begin at block 402, where data (e.g., an Ethernet data packet or Ethernet data frame) is received at the throwback router 110 from a tier 2 router 106. As described above, reception of data at the throwback router 110 can generally indicate that the transmitting tier 2 router 106 is unable to directly transmit the packet to a destination tier 1 router 104.

At block 404, the throwback router 110 inspects a timeout value for the received data. As noted above, the timeout value may be included within the data (e.g., within a position corresponding to the optional 802.1Q tag of a data frame). In one embodiment, a timeout value may be included within data during transmission of the data from a tier 1 router 104. In another embodiment, a timeout value may be included within data by the throwback router 110. For example, at block 404, the throwback router 110 may detect an absence of a timeout value, and instantiate a timeout value within the data. Illustratively, the magnitude of a timeout value can determine how many times the data may be retransmitted by the throwback router 110. While timeout values are generally described herein as descending values, alternative embodiments may utilize ascending timeout values.

With continued reference to block 404, if the timeout value of data has reached a threshold level (e.g., zero), the throwback router 110 determines that the data has timed out. Such a timeout may occur where data has been repeatedly retransmitted by the throwback router 110 to a tier 2 router 106, and the data has failed to reach its destination tier 1 router 104. Accordingly, the throwback router 110 may halt further processing of the data in order to prevent continuous retransmission of the data. The routine 400 may thereafter end at block 412.

In the instance that the timeout value has not reached the threshold level, the routine 400 continues at block 406, where the timeout value is decremented or otherwise modified by a specified amount (e.g., one). Such decrementing ensures that, with a number of repeated implementations of the routine 400 by the throwback router 110 (or an additional throwback router 110), the timeout value will reach a specified threshold level, and therefore timeout.

Thereafter, the routine 400 continues at block 408, where the throwback router 110 selects an alternative tier 2 router 106 to which to transmit the data. In one embodiment, the throwback router 110 implements a load balancing algorithm to balance the load of all transmitted data across available tier 2 routers 106. Accordingly, block 408 may include utilization of a load-balancing algorithm, such as a hash algorithm executed against the data packet or use of equal-cost multi-path routing (ECMP), to select an available tier 2 router 106. Illustratively, the throwback router 110 may exclude the tier 2 router 106 from which data was received from such a load-balance algorithm (as that tier 2 router 106 has not valid connection with the destination tier 1 router 104).

After selection of an additional tier 2 router 106, the throwback router 110 transmits the data to the selected additional tier 2 router 106 at block 410. The routine thereafter ends at block 412. In the instance that the selected additional tier 2 router 106 has a valid connection to the destination tier 1 router 104, the data may be expected to be transmitted to the destination tier 1 router 104 by the selected additional tier 2 router 106. Alternatively, if the selected additional tier 2 router 106 does not have a valid connection with the destination tier 1 router 104, the data packet can be expected to be returned to the throwback router 110. In such an instance, the routine 400 may be implemented repeatedly, until the timeout value of the data is reached.

One skilled in the art will appreciate that alternative implementations of routine 400 may be possible, and are contemplated within the scope of this disclosure. For example, in one instance, block 406 may occur prior to inspection of a timeout value (block 404). In another instance, block 406 may occur subsequent to selection of a tier 2 router 106 (block 408). As a further example, timeout functionality may be implemented at least in part by additional components of the folded Clos network 100. Illustratively, tier 2 routers may be configured to modify a timeout value associated with data, or to halt processing of data after reaching a threshold timeout value. Accordingly, the arrangement and description of blocks within FIG. 4 is intended to be illustrative in nature.

While the routine 400 is described above as utilizing a timeout value to prevent looping of data, alternative loop prevention techniques are possible and within the scope of this disclosure. For example, in some instances data may be tagged (e.g., within optional portions of a data packet or frame) with an identifier of each tier 2 router 106 that has transmitted the data. Accordingly, a throwback router 110 may be configured to select, for retransmission of the data, a tier 2 router 106 that has not previously transmitted the data. In one embodiment, a throwback router 110 may be configured to modify data to include an identifier of a tier 2 router 106 immediately after receiving the data from the tier 2 router 106. In another embodiment, a throwback router 110 may be configured to modify data to include an identifier of a tier 2 router 106 immediately prior to transmitting the data to the tier 2 router 106. In yet another embodiment, each tier 2 router 106 may be configured to modify data to include an individual identifier of the tier 2 router 106. In these embodiments, block 408 of the routine 400 may include selection of an additional tier 2 router 106 not yet identified within the data packet. In still more embodiments, one or more throwback routers 110 may store (e.g., individually or collectively) a record of attempted tier 2 routers 106 for each data packet, without modifying the data packet itself.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to facilitate resilient network communications, the system comprising:
    a folded clos network comprising a plurality of tier 1 routers in communication with a plurality of tier 2 routers, the folded clos network configured to facilitate communication between client computing devices of the plurality of tier 1 routers; and
    a throwback router in communication with the plurality of tier 2 routers;
    wherein individual tier 2 routers of the plurality of tier 2 routers are configured to:
        receive data from a source tier 1 router for delivery to a destination tier 1 router;
        determine that a link failure has occurred between the individual tier 2 router and the destination tier 1 router; and
        transmit the data to the throwback router; and
    wherein the throwback router is configured to:
        receive the data from the individual tier 2 router;
        select an additional tier 2 router of the plurality of tier 2 routers to which to transmit the data; and
        transmit the data to the additional tier 2 router for delivery to the destination tier 1 router.

2. The system of claim 1, wherein the plurality of tier 2 routers form a logical aggregate tier 2 router within the folded Clos network.

3. The system of claim 1, wherein the source tier 1 router utilizes link aggregation control protocol (LACP) to aggregate network connections to the plurality of tier 2 routers.

4. The system of claim 1, wherein the source tier 1 router is configured to:
    receive the data from a source client computing device for delivery to a destination client computing device associated with the destination tier 1 router;
    transmit the data to an individual tier 2 router for delivery to a destination tier 1 router.

5. The system of claim 1, wherein the individual tier 2 router to which the data is transmitted is selected based at least in part on a load-balancing algorithm.

6. The system of claim 1, wherein the additional tier 2 router is configured to receive the data and transmit the data to the destination client computing device.

7. The system of claim 1 further comprising a second throwback router in communication with the plurality of tier 2 routers.

8. A method of facilitating resilient communication within a folded Clos network, wherein the folded Clos network comprises a plurality of tier 1 routers in communication with a plurality of tier 2 routers, the method comprising:
    at a first tier 2 router of the folded Clos network:
        receiving data from a source tier 1 router for delivery to a destination tier 1 router;
        determining that a communication failure has occurred between the first tier 2 router and the destination tier 1 router; and
        transmitting the data to a throwback router in communication with each of the plurality of tier 2 routers; and
    at the throwback router:
        receiving the data from the first tier 2 router;
        selecting an additional tier 2 router of the plurality of tier 2 routers to which to transmit the data; and
        transmitting the data to the additional tier 2 router.

9. The method of claim 8, wherein the data is an Ethernet frame.

10. The method of claim 8 further comprising modifying the data to include a timeout value.

11. The method of claim 10, wherein modifying the data to include the timeout value includes modifying a portion of the data associated with optional content.

12. The method of claim 8 further comprising decrementing a timeout value of the data.

13. The method of claim 8 further comprising:
    detecting that a timeout value of the data has reached a threshold amount; and
    halting processing of the data.

14. The method of claim 8, wherein the plurality of tier 2 routers form a logical aggregate tier 2 router within the folded Clos network.

15. A non-transitory computer-readable storage medium including computer-executable instructions for facilitating resilient communication within a folded Clos network, wherein the folded Clos network comprises a plurality of tier 1 network devices in communication with a plurality of tier 2 network devices, the computer-executable instructions comprising:
    first computer-executable instructions that, when executed by a tier 2 network device, cause the tier 2 network device to:
        on reception of data from a source tier 1 network device for delivery to a destination tier 1 network device, determine that a communication failure has occurred between the executing tier 2 network device and the destination tier 1 router; and
        transmit the data to a throwback network device in communication with the executing tier 2 network device; and
    second computer-executable instructions that, when executed by the throwback network device, cause the throwback network device to:

on reception of the data from the executing tier 2 network device, select an additional tier 2 router of the plurality of tier 2 routers to which to transmit the data; and transmit the data to the additional tier 2 network device.

16. The non-transitory computer-readable storage medium of claim 15, wherein the plurality of tier 1 network devices are routers.

17. The non-transitory computer-readable storage medium of claim 15, wherein the plurality of tier 2 network devices are routers.

18. The non-transitory computer-readable storage medium of claim 15, wherein the determination that a communication failure has occurred between the executing tier 2 network device and the destination tier 1 router includes a determination that a physical link failure between the executing tier 2 network device and the destination tier 1 router has occurred.

19. The non-transitory computer-readable storage medium of claim 15, wherein the source tier 1 router is configured to select the tier 2 network device based at least in part on a load-balancing algorithm.

20. The non-transitory computer-readable storage medium of claim 19, wherein the load-balancing algorithm includes at least one of a flow hash algorithm or an equal-cost multi-path routing (ECMP) algorithm.

21. The non-transitory computer-readable storage medium of claim 15, wherein the second computer-executable instructions cause the throwback router to select an additional tier 2 router of the plurality of tier 2 routers to which to transmit the data based at least in part on a load-balancing algorithm.

22. The non-transitory computer-readable storage medium of claim 15, wherein the second computer-executable instructions cause the throwback router to modify a portion of the data associated with a timeout value.

23. The non-transitory computer-readable storage medium of claim 15, wherein the second computer-executable instructions cause the throwback router to detect that a timeout value of the data has reached a threshold amount and halt processing of the data.

* * * * *